United States Patent [19]

Lew

[11] Patent Number: 4,884,458

[45] Date of Patent: * Dec. 5, 1989

[54] HIGH SENSITIVITY VORTEX SHEDDING FLOWMETER

[76] Inventor: Hyok S. Lew, 7890 Oak St., Arvada, Colo. 80005

[*] Notice: The portion of the term of this patent subsequent to Mar. 1, 2005 has been disclaimed.

[21] Appl. No.: 147,812

[22] Filed: Jan. 25, 1988

Related U.S. Application Data

[63] Continuation-in-part of Ser. No. 920,977, Oct. 20, 1986, Pat. No. 4,754,649, which is a continuation-in-part of Ser. No. 31,902, Mar. 30, 1987, Pat. No. 4,807,481, which is a continuation-in-part of Ser. No. 12,680, Feb. 9, 1987, Pat. No. 4,803,870, which is a continuation-in-part of Ser. No. 133,315, Dec. 17, 1987.

[51] Int. Cl.$^4$ ................................................ G01F 1/32
[52] U.S. Cl. ................................................ 73/861.24
[58] Field of Search ............ 73/861.22, 861.23, 861.24

[56] References Cited

U.S. PATENT DOCUMENTS

| | | | |
|---|---|---|---|
| 3,116,639 | 1/1964 | Bird | 73/861.24 |
| 4,669,012 | 10/1987 | Lew et al. | 73/861.24 |
| 4,791,818 | 12/1988 | Wilde | 73/861.24 |

FOREIGN PATENT DOCUMENTS 233857 10/1981 German Democratic Rep. ............... 73/861.24

Primary Examiner—Stewart J. Levy
Assistant Examiner—Robert P. Bell

[57] ABSTRACT

The vortex shedding flowmeter comprises a vortex generating bluff body of an elongated shape disposed across a cross section of a flow passage, that includes a blunt leading edge and a planar trailing edge, which planar trailing edge has two sides shielded from the moving fluid by a planar shielding member enclosing at least two sides of the planar trailing edge wherein the two sides of the planar trailing edge are respectively exposed to the fluid pressure at the two sides of the bluff body by one or more pressure openings. The vortex generating bluff body is mechanically coupled to a transducer that converts the alternating lift forces on the bluff body exerted by the vortices shed from the two sides of the bluff body in an alternating pattern to electrical signals, wherein the alternating lift forces generating the electrical signals are amplified by the planar trailing edge of the bluff body as the two sides of the planar trailing edge are respectively exposed to the alternating fluctuations of the fluid pressure associated with the vortex shedding by the pressure openings open to specific locations in the two sides of the bluff body where the alternating fluctuations of the fluid pressure is mostly pronounced. The vortex shedding flowmeter of the present invention may further include a wing sensor disposed parallel to the bluff body across another cross section of the flow passage downstream of the bluff body, which wing sensor may be coupled to the same transducer coupled to the bluff body or another transducer wherein electrical signals from the two transducers are synthesized to exclude noises and extract the vortex signals at the maximum level.

12 Claims, 2 Drawing Sheets

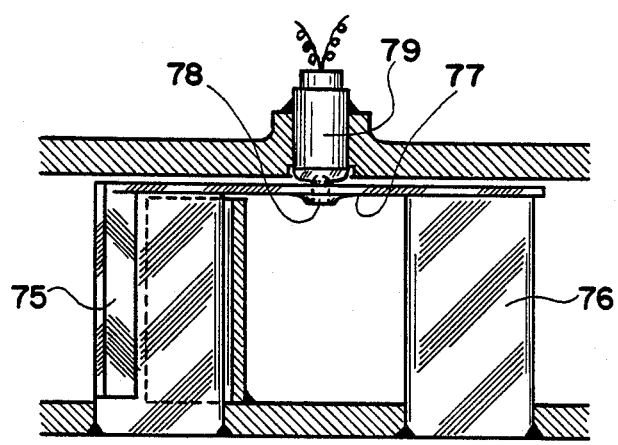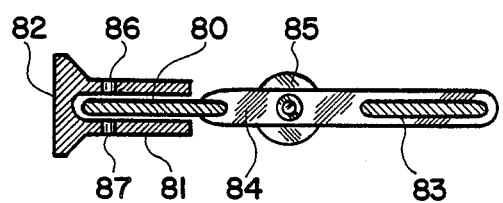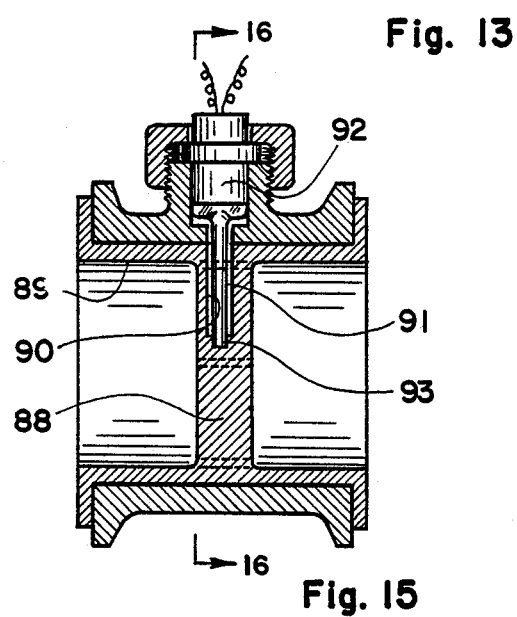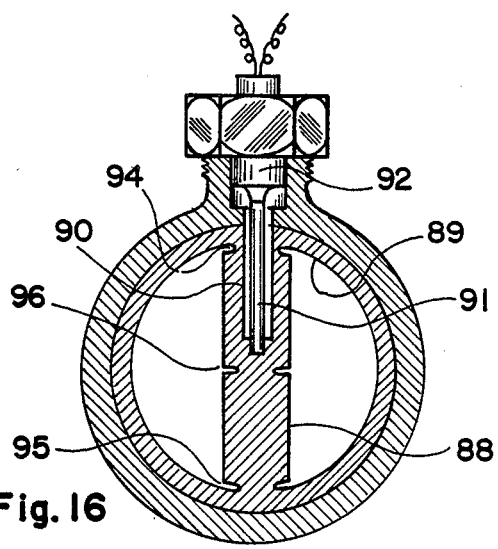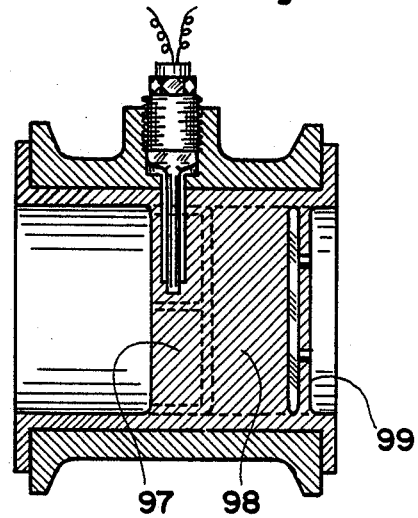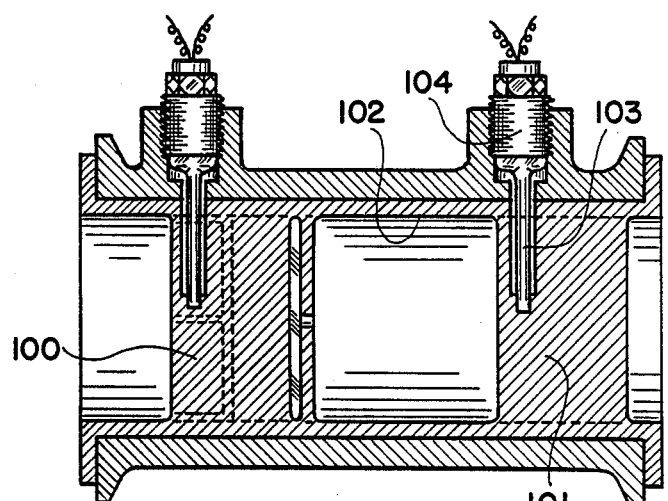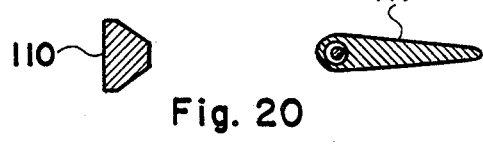

HIGH SENSITIVITY VORTEX SHEDDING FLOWMETER

BACKGROUND OF THE INVENTION

This patent application is a continuation-in-part application to patent application Ser. No. 06/920,977 entitled "Tandem Wing Universal Vortex Shedding Flowmeter" filed on Oct. 20, 1986, now U.S. Pat. No. 4,754,649 which is a continuation-in-part of Ser. No. 07/031,902 entitled "Three-In-One Vortex Shedding Flowmeter" filed on Mar. 30, 1987, now U.S. Pat. No. 4,807,481 which is a continuation-in-part of Ser. No. 07/012,680 entitled "Vortex Shedding Flowmeter with Mechanically Amplifying Pressure Sensor" filed on Feb. 9, 1987, now U.S. Pat. No. 4,803,870 and which is a continuation-in-part of Ser. No. 07/133,315 entitled "High Sensitivity-High Resonance Frequency Vortex Shedding Flowmeter" filed on Dec. 17, 1987.

The turbine or paddle type flowmeter has been used almost exclusively in measuring volumetric rate of fluid flows in domestic and industrial flow measurements until the vortex shedding flowmeter were developed in the late nineteen seventies. The turbine or paddle type flowmeters employ rotating members supported by bearings which are not suitable for operation under adverse conditions such as high temperature environments or abrasive fluid flows. The vortex shedding flowmeters do not have any moving parts and do not employ any delicate components exposed to fluid streams and, consequently, they are ideal for measuring fluid flows at high temperatures and high velocities. One weakness of the existing vortex shedding flowmeters is its inability to measure fluid flow at low velocities. For example, the best vortex shedding flowmeter available at the present time is not capable of measuring air flows slower than 20 feet per second under the standard condition and water flows slower than 1.5 feet per second, while a turbine or paddle type flowmeter measures air flows as slow as 10 feet per second and water flows as low as 0.5 feet per second. The vortex shedding phenomenon occurs in a clear and regular pattern in air flows of velocities as low as a few feet per second and in water flows of velocities of a fraction of a foot per second. A high quality vortex shedding flowmeter employing an advanced design should measure low velocities as well as any turbine or paddle type flowmeter and high velocities much greater than those measurable with the turbine or paddle type flowmeter. Such a high quality vortex shedding flowmeter commands a high financial incentive, for the improvement of the minimum measurable velocity from the existing 20 feet per second to 10 feet per second for air and the existing 1.5 feet per second to 0.5 feet per second for water creates additional sales of 10 to 15 million dollars per year for the vortex shedding flowmeter.

BRIEF SUMMARY OF THE INVENTION

The primary object of the present invention is to provide a vortex shedding flowmeter that is compact and has a high sensitivity.

Another object is to provide a vortex shedding flowmeter comprising a vortex generating bluff body of an elongated shape, that has a blunt leading edge and a planar trailing edge of sizable surface area, wherein the two side surfaces of the planar trailing edge are shielded from the fluid stream by a shielding member enclosing the planar trailing edge and are respectively exposed to the fluctuating fluid pressures at the two sides of the bluff body by one or more pressure openings open to the two side surfaces of the bluff body at locations where the amplitude of the fluctuations in the fluid pressure is most pronounced.

A further object is to provide a vortex shedding flowmeter that employs a stress concentration mechanism in amplifying the stress generated by the alternating lift forces on the bluff body associated with the vortex shedding from the two sides thereof in an alternating pattern, which stress is transmitted to a transducer that generates electric signals representing the vortex shedding.

Yet another object is to provide a vortex shedding flowmeter comprising dual lift force generating members that includes a first lift force generating member included in the vortex generating bluff body and a second lift force generating member disposed downstream of the bluff body.

Yet a further object is to provide a vortex shedding flowmeter for sanitary or corrosive applications wherein the transducer assembly is completely isolated from the wetted surfaces of the flowmeter.

Still another object is to provide a vortex shedding flowmeter which determines the volume flow from the frequency of the alternating lift forces generated by the vortex shedding and the mass flow from the amplitude of the same alternating lift forces.

Still a further object is to provide a vortex shedding flowmeter including a built-in calibration means for checking the accuracy of the amplitude measurement of the alternating lift forces, that comprises a means for exerting a force of known magnitude to the lift force generating member and measuring the amplitude of the electric signal from the transducer generated by that force, wherein the ratio therebetween is used to determine the amplitude of the alternating lift forces from the electric signals generated thereby.

These and other objects of the present invention will become clear as the description which follows.

BRIEF DESCRIPTION OF THE FIGURES

The present invention may be described with great clarity and specificity by referring to the following figures:

FIG. 13 illustrates an embodiment of the vortex shedding flowmeter of the present invention comprising dual vortex force detecting members.

FIG. 14 illustrates a cross section of another embodiment of the vortex shedding flowmeter of the present invention comprising dual vortex force detecting members.

FIG. 15 illustrates an embodiment of the vortex shedding flowmeter of the present invention comprising a bluff body constructed as an integral part of the flow passage lining.

FIG. 16 illustrates a cross section of the embodiment shown in FIG. 15.

FIG. 17 illustrates another embodiment of the vortex shedding flowmeter of the present invention comprising a bluff body constructed as an integral part of the flow passage lining.

FIG. 18 illustrates an embodiment of the vortex shedding flowmeter of the present invention comprising dual vortex force detecting members constructed as an integral part of the flow passage lining.

FIG. 19 illustrates an embodiment of the transducer assembly of the present invention usable in conjunction with the embodiment shown in FIG. 18.

FIG. 20 illustrates a cross section of an embodiment of the vortex shedding flowmeter of the present invention employing a simple bluff body and a vortex force detecting wing disposed downstream to the bluff body.

DESCRIPTION OF THE ILLUSTRATED EMBODIMENTS

Figure 1:
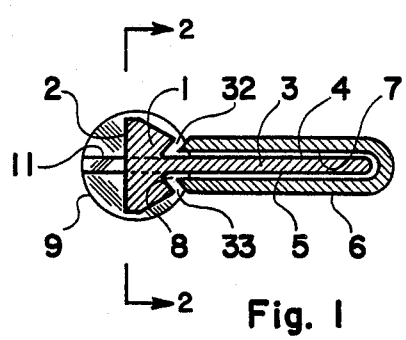
FIG. 1 illustrates a cross section of the vortex generating bluff body of the present invention including a blunt leading edge and a planar trailing edge which planar trailing edge is shielded from the moving fluid.

In FIG. 1 there is illustrated a cross section of an embodiment of the vortex generating bluff body of the present invention, which is employed in the construction of the vortex shedding flowmeter of the present invention. The bluff body 1 has an elongated cylindrical geometry disposed across a cross section of a flow passage, which bluff body 1 has a blunt leading edge 2 and a planar trailing edge 3. The two side surfaces 4 and 5 of the planar trailing edge 3 are shielded from the moving fluid flowing by the bluff body 1 by a shielding member 6 of an elongated shape disposed parallel to the bluff body across a cross section of the flow passage, which shielding member 6 includes a cavity 7 with an open edge 8 that is engaged by the planar trailing edge 3 in a clearance relationship. One extremity of the bluff body 1 is connected or coupled to a container vessel 9 containing a transducer element.

Figure 2:
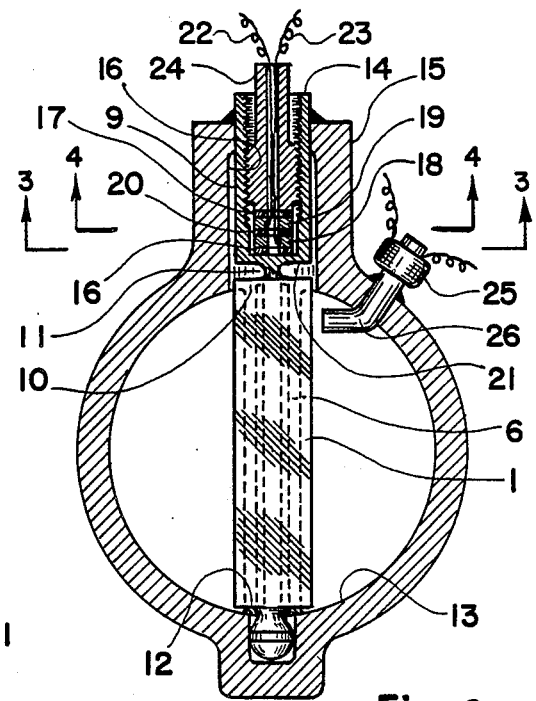
FIG. 2 illustrates a cross section of an embodiment of the vortex shedding flowmeter of the present invention comprising the bluff body shown in FIG. 1, that is disposed across a flow passage in the flowmeter.

In FIG. 2 there is illustrated a cross section of an embodiment of the vortex shedding flowmeter of the present invention employing the bluff body 1 shown in FIG. 1, which shows a view taken along plane 2—2 as shown in FIG. 1. One extremity 10 of the bluff body is connected to the transducer container vessel 9 of an elongated shape by a thin section 11 disposed parallel to the central axis of the flow passage, while the other extremity 12 of the bluff body 1 is secured to the flow passage wall 13 in a simple support. The extremity 14 of the cylindrical container vessel 9 is secured to the flowmeter body 15 in a leak-proof arrangement. It should be noticed that the cavity 16 in the flowmeter body 15 receives the cylindrical container vessel 9 in a clearance relationship and consequently, the combination of the bluff body 1 and the cylindrical container vessel 9 is structurally a beam supported at the two ends thereof, which beam has a slender section at a midsection comprising the thin section 11. The shield member 6 extending across the cross section of the flow passage is rigidly secured to the flow passage wall 13 as one or both extremities thereof are affixed to the flow passage wall 13. The cylindrical container vessel 9 includes a cavity containing two Piezo electric discs 16 and 17, and a pair of conductor discs 18 and 19 separated by a dielectric insulator disc 20, which are assembled in a stacked construction under a pressurized contact with a thin end wall 21 of the cavity, from which the thin section 11 extends. A pair of electric wires 22 and 23 respectively extending from the two conductor discs 18 and 19 are routed through a hole included in a threaded cap 24 threadedly engaging the cavity opening and compressing the transducer assembly onto the thin flange 21. As an option, the vortex shedding flowmeter of the present invention may include an electromagnet 25 with a core 26 extending through the flow passage wall in a leak-proof manner and terminated at a close proximity to one side surface of the bluff body 1 or that of the planar trailing edge 3.

Figure 3:
FIG. 3 illustrates a cross section of a transducer of the present invention usable in conjuntion with the bluff body of the present invention.

In FIG. 3 there is illustrated a cross section of the transducer assembly included in the embodiment shown in FIG. 2, which cross section taken along plane 3—3 as shown in FIG. 2 shows the first Piezo electric disc 16 having two oppositely polarized halves 27 and 28, which two halves are disposed in a symmetric geometry about a plane including the thin section 11 that is parallel to the central axis of the flow passage.

Figure 4:
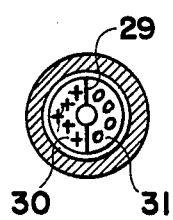
FIG. 4 illustrates another cross section of the transducer of the present invention.

In FIG. 4 there is illustrated another cross section of the transducer assembly included in the embodiment shown in FIG. 2, which cross section taken along plane 4—4 as shown in FIG. 2 shows the second Piezo electric disc 17 having the same polarization over the entire disc.

Figure 5:
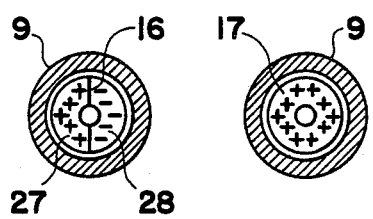
FIG. 5 illustrates a cross section of another embodiment of the transducer equivalent to the cross section shown in FIG. 3.

In FIG. 5, there is illustrated a cross section of another embodiment of the transducer assembly taken along the same plane as the plane 3—3, which has the same construction as the assembly included in the embodiment shown in FIG. 2 with the exception that the Piezo electric disc 16 with two oppositely polarized halves 27 and 28 is now replaced by a Piezo electric disc 29 having only one half 30 polarized wherein the other half 31 may be electrically neutral or dummy element.

The vortex shedding flowmeter of the present invention illustrated in FIGS. 1, 2, 3 and 4 or 5 operates on the following principles: The vortices shed from the two sides of the bluff body 1 in an alternating pattern produce fluctuations of the fluid pressure at the two sides of the bluff body in an alternating pattern. The two side surfaces 4 and 5 of the planar trailing edge 3 of the bluff body 1 is exposed to the fluctuating fluid pressures by the pressure openings 32 and 33 disposed at a location where the fluctuations of the fluid pressure is most pronouned. As a consequence, the fluctuating fluid pressure occuring in an alternating mode at the two sides of the bluff body 1 produces alternating lift forces on the bluff body, which are magnified by the large surface of the planar trailing edge 3. The alternating lift forces on the bluff body produce alternating bending moments in the beam structure comprising the bluff body 1 and the cylindrical transducer container vessel 9, which bending moments generate highly concentrated stresses in couples at the thin midsection 11 thereof, which are transmitted to the stack of the transducer elements. The two halves of the Piezo electric discs 16 and 17 are alternatively compressed and decompressed by the concentrated bending moments resulting from the alternating lift forces associated with the vortex shedding. The first Piezo electric dics 16 with two oppositely polarized halves 27 and 28 generates alternating electromotive forces at the same frequency as the vortex shedding frequency as a result of the alternating lift forces on the bluff body 1, which alternating lift forces generate little signals from the second Piezo electric disc 17 of common polarization. The structural vibrations of the flowmeter body transmitted from the pipe line vibrations generate high noise signals from the Piezo electric disc 17 and little noise signals from the Piezo electric disc 16. By combining the electric signals from the two Piezo electric discs 16 and 17 in such a way that the noise signals cancel therebetween, a pure alternating electromotive force representing the vortex shedding is obtained. The frequency of vortex shedding is proportional to the fluid velocity and the magnitude of the alternating lift forces on the bluff body is proportional to the dynamic pressure of the fluid flow. The fluid velocity is determined from the frequency of the alternating electromotive forces generated by the transducer, while the dynamic pressure of the fluid flow is determined from the amplitude of the alternating electromotive forces from the transducer. The mass flow is calculated as the ratio of the dynamic pressure to one half of the fluid velocity and the fluid density is calculated as the ratio of the dynamic pressure to one half of the square of the fluid velocity. The frequency of the alternating electromotive forces from the transducer is always the same as the vortex shedding frequency independent of the electro-mechanical characteristics of the bluff body-transducer assembly combination. However, the relationship between the amplitude of the alternating lift forces on the bluff body and the amplitude of the alternating electromotive forces from the transducer can vary as a function of the electro-mechanical characteristics of the bluff body-transducer assembly combination, which can change in time due to temperature, fatigue of materials and wear of the elements. The electromagnet 25 exerts a lateral force of known magnitude to the bluff body periodically or intermittently and an electronic data processor takes the ratio of the magnitude of the electromagnetic force to the amplitude of electric signal from the transducer generated thereby. The accurate value of the amplitude of the alternating lift forces of the bluff body is obtained by multiplying the aforementioned ratio to the amplitude of the alternating electromotive forces from the transducer generated by the vortices, and, consequently, the dynamic pressure of the fluid flow is determined accurately independent of the changing electro-mechanical characteristics of the flowmeter system.

Figure 6:
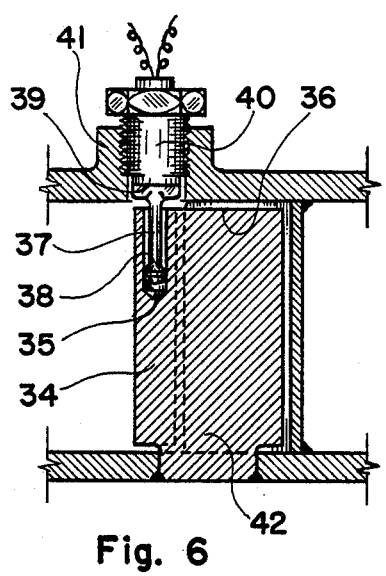
FIG. 6 illustrates another embodiment of the vortex shedding flowmeter of the present invention comprising the bluf body with a cross section shown in FIG. 1.

In FIG. 6 there is illustrated another embodiment of the vortex shedding flowmeter of the present invention that employs the bluff body embodiment shown in FIG. 1. In this embodiment the leading edge portion of the bluff body 34 includes a socket 35 disposed at one extremity 36 of the bluff body, which socket receives an elongated member 37 with a ball or enlarged end 38 tightly engaging the socket 35. The elongated member 37 extends from a thin section or rib included in the thin flange of the transducer container vessel 40 rigidly secured to the flowmeter body 41, which container vessel has the same construction as that illustrated in FIGS. 2, 3 and 4 or 5. One extremity 42 of the bluff body opposite to the transducer container vessel 40 is fixedly or simply secured to the flow passage wall, while the other extremity 36 adjacent to the transducer container vessel 40 may be free as shown in FIG. 6 or secured simply as shown in FIG. 7 or fixedly as shown in FIG. 17 to the flow passage wall.

Figure 7:
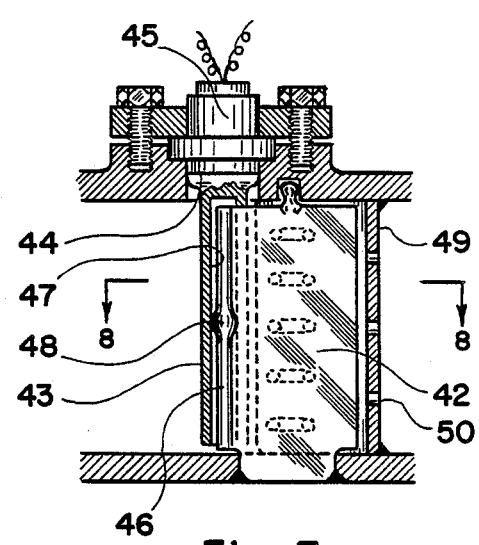
FIG. 7 illustrates a further embodiment of the vortex shedding flowmeter of the present invention.

In FIG. 7 there is illustrated a further embodiment of the vortex shedding flowmeter of the present invention, that employs the bluff body embodiment shown in FIG. 1. In this embodiment, the planar trailing edge 42 secured to the flow passage wall at one or both extremities is joined to the leading edge portion 43 of the bluff body extending from the thin flange 44 of the transducer container vessel 45 in a sliding arrangement comprising a slide rail 46 included in the planar trailing edge 42 and a slide groove 47 included in the leading edge portion 43 of the bluff body. The sliding joint between the leading and trailing edge portions 43 and 42 of the bluff body may include a ball joint 48 disposed at a midsection thereof, which ball joint enhances the transmission of the stress from the bluff body to the transducer elements. The shielding member 49 enclosing the trailing edge portion of the bluff body may include a plurality of openings 50 which help to flush out debries trapped in the cavity of the shielding member 49.

Figure 8:
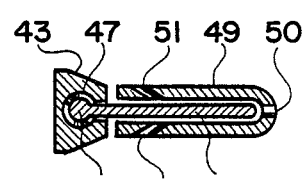
FIG. 8 illustrates a cross section of the bluff body included in the embodiment shown in FIG. 7.

In FIG. 8 there is illustrated a cross section of the bluff body employed in the vortex shedding flowmeter shown in FIG. 7, which cross section is taken along plane 8—8 as shown in FIG. 7, which shows the sliding joint joining the trailing edge portion 42 of the bluff body to the leading edge portion 43. The shielding member 49 may include additional pressure holes 51, 52, etc., which further expose the two sides of the planar trailing edge 42 of the bluff body to the fluctuating fluid pressure. The embodiment of the bluff body shown in FIGS. 7 and 8 is particularly desirable for applications to fluid flows of an abrasive nature where the leading edge of the bluff body experiences abrasion and requires frequent replacement.

Figure 9:
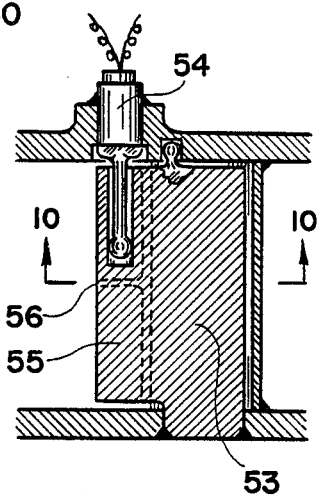
FIG. 9 illustrates yet another embodiment of the vortex shedding flowmeter of the present invention.

In FIG. 9 there is illustrated yet another embodiment of the vortex shedding flowmeter of the present invention having a construction similar to the embodiment shown in FIG. 6 with two exceptions. Firstly, the extremity of the trailing edge portion 53 of the bluff body adjacent to the transducer container vessel 54 is simply secured to the flow passage wall. Secondly, the midsection of the leading edge portion 55 of the bluff body includes a thin section 56 wherein the thick leading edge portion 55 is reduced to a thickness comparable to that of the planar trailing edge portion 53 of the bluff body.

Figure 10:
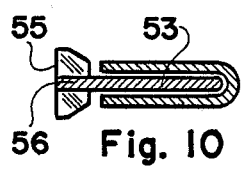
FIG. 10 illustrates a cross section of the bluff body included in the embodiment shown in FIG. 9.

In FIG. 10 there is illustrated a cross section of the thin section of the bluff body employed in the embodiment shown in FIG. 9, which cross section is taken along plane 10—10 as shown in FIG. 9. The thin midsection 56 enhances bending of the bluff body at the midsection thereof and, consequently, improves the sensitivity of the flowmeter, as the alternating lift forces on the bluff body produce greater lateral deflection of the bluff body that transmits greater stress to the transducer assembly.

Figure 11:
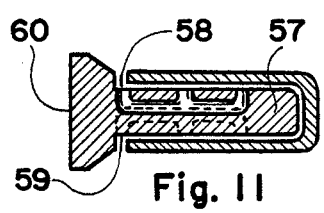
FIG. 11 illustrates a cross section of another embodiment of the bluff body of the present invention.

In FIG. 11 there is illustrated a cross section of another embodiment of the bluff body of the present invention, which includes additional pressure communicating holes disposed through the planar trailing edge 57 of the bluff body, wherein a plurality of holes 58 with multiple openings open to one side of the trailing edge 57 and a plurality of holes 59 with multiple openings open to the other side of the trailing edge 57 further expose the two sides of the trailing edge 57 to the fluctuating fluid pressure at the two sides of the leading edge 60 of the bluff body.

Figure 12:
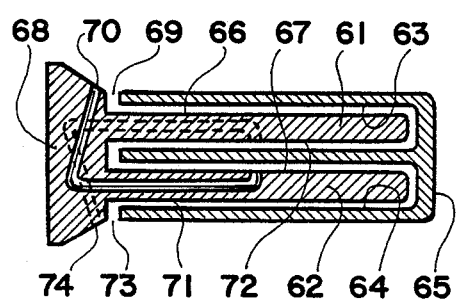
FIG. 12 illustrates a cross section of a further embodiment of the bluff body of the present invention.

In FIG. 12 there is illustrated a cross section of a further embodiment of the bluff body of the present invention that includes two or more planar trailing edges 61 and 62 respectively enclosed within two shielding cavities 63 and 64 included in the shielding member 65. The first sides 66 and 67 of the planar trailing edges are exposed to the fluctuating fluid pressure at one side of the bluff body 68 by the pressure opening 69 and a plurality of pressure holes 70 distributed following the length of the bluff body, while the second sides 71 and 72 of the planar trailing edges are exposed to the fluctuating fluid pressure at the other side of the bluff body 68 by the pressure opening 73 and a plurality of pressure holes 74 disposed following the length of the bluff body. The sensitivity of the flowmeter increases in proportion to the number of the planar trailing edges of the bluff body, as the multiple planar trailing edges produce greater alternating lift forces.

In FIG. 13 there is illustrated an embodiment of the vortex shedding flowmeter of the present invention that comprises dual lift force generating members 75 and 76. The first lift force generating member is a bluff body having a cross section similar to the embodiment shown in FIGS. 1 or 10 or 12 that is secured to the flow passage wall at one extremity and connected to a connector bar 77 at the other extremity. The second lift force generating member is a wing or simple planar member 76 disposed parallel to the bluff body across a downstream cross section of the flow passage, which is secured to the flow passage wall at one extremity and connected to the connector bar 77 at the other extremity. The force receiving member 78 extending from the thin flange of the transducer container vessel 79 is connected to the connector bar 77. The vortex shedding flowmeter including a dual lift force generating members has a higher sensitivity, as the amplitude of the alternating lift forces produced by the dual lift force generating members is equal to two times that of the single lift force generating member.

In FIG. 14 there is illustrated a cross section of another embodiment of the dual lift force generating members, which has a construction similar to the embodiment shown in FIG. 13. This embodiment includes a pair of planar members generating lift forces from the vortices, wherein the first planar member or pressure panel 80 is disposed in a planar cavity included in the planar trailing edge 81 of the bluff body 82, while the second planar member or wing 83 is disposed downstream thereto. Both lift generating members are secured to the flow passage wall at the first extremities and to the connector bar 84 at the second extremities thereof. The connector bar 84 is connected to the force receiving member extending from the thin flange of the transducer container vessel 85. The two sides of the first planar member 80 are respectively exposed to the fluctuating fluid pressures at the two sides of the bluff body 82 by a plurality of pressure holes 86, 87, etc. disposed following the length of the bluff body 82 which is rigidly secured to the fluid passage wall at both extremities thereof.

In FIG. 15 there is illustrated an embodiment of the vortex shedding flowmeter of the present invention comprising a bluff body constructed as an integral part of the flow passage lining. The bluff body 88 disposed across a cross section of the flow passage is connected to the flow passage wall or lining thereof at both extremities in an arrangement wherein the bluff body 88 becomes an integral part of the flow passage lining 89. The bluff body 88 has a hole disposed therethrough in a lengthwise direction that receives a force receiving member 91 extending from the thin flange of the transducer container vessel 92 in a clearance relationship, wherein the extremity 93 of the force receiving member 91 is anchored to the bluff body at a midsection thereof.

In FIG. 16 there is illustrated a cross section of the embodiment shown in FIG. 15, which cross section is taken along a plane 16—16 as shown in FIG. 15. The bluff body may include the thin sections 94 and 95 respectively disposed at the two extremities thereof and the thin section 96 disposed at a midsection thereof, which thin sections enhance the lateral deflection of the bluff body under the alternating lift forces thereon and produce a higher bending stress on the force receiving member 91. It should be mentioned that the bluff body 88 may have a cantilever construction wherein the extremity opposite to the transducer container vessel 92 is disconnected from the flow passage wall. The construction of the vortex shedding flowmeter comprising the bluff body constructed as an integral part of the flow passage lining is particularly suitable for a flowmeter having all wetted surface lines with plastic linings, which type of flowmeter is ideal for sanitary or highly corrosive fluid flows.

In FIG. 17 there is illustrated another embodiment of the vortex shedding flowmeter of the present invention comprising the bluff body constructed as an integral part of the flow passage lining, which has essentially the same construction as the embodiment shown in FIG. 16 with one exception being that the bluff body 97 has a planar trailing edge 98 shielded by a shielding member 99 as shown by the cross section illustrated in FIG. 10.

In FIG. 18 there is illustrated a further embodiment of the vortex shedding flowmeter of the present invention including one hundred percent lined wetted surfaces, which includes a vortex generating-sensing bluff body 100 having the same construction as the bluff body included in the embodiment shown in FIG. 17 and a vortex sensing wing 101 constructed as an integral part of the flow passage lining 102, which has the force receiving member 103 extending from the transducer container vessel 104 embedded therein in an arrangement described in conjunction with FIG. 16. The signals from the two transducers respectively coupled to the two lift force generating members 100 and 101 are combined in such a way that the noises are canceled and refined vortex signals are retrieved. The vortex sensing wing 101 may be replaced with another vortex generating-sensing bluff body having the same construction as the bluff body 100, which is now disposed in a mirror image to the bluff body 100 about a cross section of the flow passage intermediate the two lift force generating members, which modification provides a vortex shedding flowmeter capable of measuring bidirectional fluid flows. Such a modification is also applicable to the embodiment shown in FIGS. 13 or 14.

In FIG. 19 there is illustrated a pair of force receiving members 105 and 106 connected to one another by a connector bar 107 that is connected to a planar force transmitting member 108 extending from the thin flange of the transducer container vessel 109, which combination is for replacing the two separate transducer assemblies included in the embodiment shown in FIG. 18.

In FIG. 20 there is illustrated a cross section of yet another embodiment of the vortex shedding flowmeter of the present invention that comprises a simple vortex generating bluff body 110 disposed across a cross section of the flow passage and a vortex sensing wing 111 having the same construction as the element 101 shown in FIG. 18 disposed across a downstream cross section of the flow passage. The embodiments shown in FIGS. 15-20 are highly suitable for the construction of inexpensive all plastic body or plastic lined vortex shedding flowmeters.

While the principles of the present invention have now been made clear by the illustrative embodiments, there will be immediately obvious modifications of the structures, arrangements, proportions, elements and materials which are particularly adapted to the specific working environments and operating conditions in the practice of the invention without departing from those principles. It is not desired to limit the inventions to the particular illustrated embodiments shown and described and, accordingly, all suitable modifications and equivalents may be resorted to falling within the scope of the inventions as defined by the claims which follow.

The embodiments of the invention, in which an exclusive property or priviledge is claimed, are defined as follows:

1. An apparatus for measuring fluid flows comprisng in combination:
   (a) a flowmeter body including a flow passage;
   (b) a vortex generator of an elongated cylindrical shpae disposed across a cross section of the flow passage, wherein at least one extremity of the vortex generator is secured to the flowmeter body;
   (c) a transducer contained in a container vessel secured to the flowmeter body, wherein the transducer is pressed onto a thin wall of the container vessel; and
   (d) a flexible coupling connecting said thin wall of the container vessel to a deflective portion of the vortex generating, wherein the flexible coupling enhances relative deflection between the vortex generator and the container vessel;
   wherein fluctuating fluid dynamic forces resulting from vortices shed from the vortex generator and experienced by vortex generator generate fluctuating electrical signals from the transducer as a measure of fluid flow through the flow passage.

2. The combination as set forth in claim 1 wherein the fluid velocity is determined from the frequency of the fluctuating electrical signals.

3. The combination as set forth in claim 1 wherein the mass flow rate of the fluid is determined from a combination of the frequency and the amplitude of the fluctuating electrical signals.

4. The combination as set forth in claim 3 wherein said combination includes means for exerting a mechanical impulse of known magnitufe on the transducer and means for measuring the amplitude of an electrical signal from the transducer generated by the mechanical impulse of known magnitude, wherein the ratio of the magnitude of the mechanical impulse to the amplitude of the electrical signal generated by the mechanical impulse is used as a calibration standard in determining the amplitude of the fluctuating fluid dynamic forces from the amplitude of the fluctuating electrical signals.

5. The combination as set forth in claim 3 wherein the density of the fluid is determined as the ratio of the mass flow rate to the volume flow rate.

6. The combination as set forth in claim 1 wherein the container vessel has an elongated geometry secured to the flowmeter body at an extremity opposite to said thin wall and said thin wall is connected to the other extremity of the vortex generator opposite to said at least one extremity by a section of reduced cross section area that provides a flexible section intermediate the container vessel and the vortex generator.

7. The combination as set forth in claim 6 wherein said vortex generator includes a planar trailing edge engaging in a clearance relationship a groove included in an elongated member disposed generally parallel to and downstream of the vortex generator and secured to the flowmeter body.

8. The combination as set forth in claim 1 wherein said flexible coupling comprises a force transmitting member extending from said thin wall of the container vessel and connected to the deflective portion of the vortex generator by a mechanical coupling.

9. The combination as set forth in claim 8 wherein said force transmitting member is connected to the other extremity of the vortex generator opposite to said at least one extremity.

10. The combination as set forth in claim 9 wherein said vortex generator includes a planar trailing edge engaging in a clearance relationship a groove included in an elongated member disposed generally parallel to and downstream of the vortex generator and secured to the flowmeter body.

11. The combination as set forth in claim 8 wherein said force transmitting member is connected to a midsection of the vortex generator.

12. The combination as set forth in claim 11 wherein said vortex generator includes a planar trailing edge engaging in a clearance relationship a groove included in an elongated member disposed generally parallel to and downstream of the vortex generator and secured to the flowmeter body.

* * * * *